Patented June 9, 1936

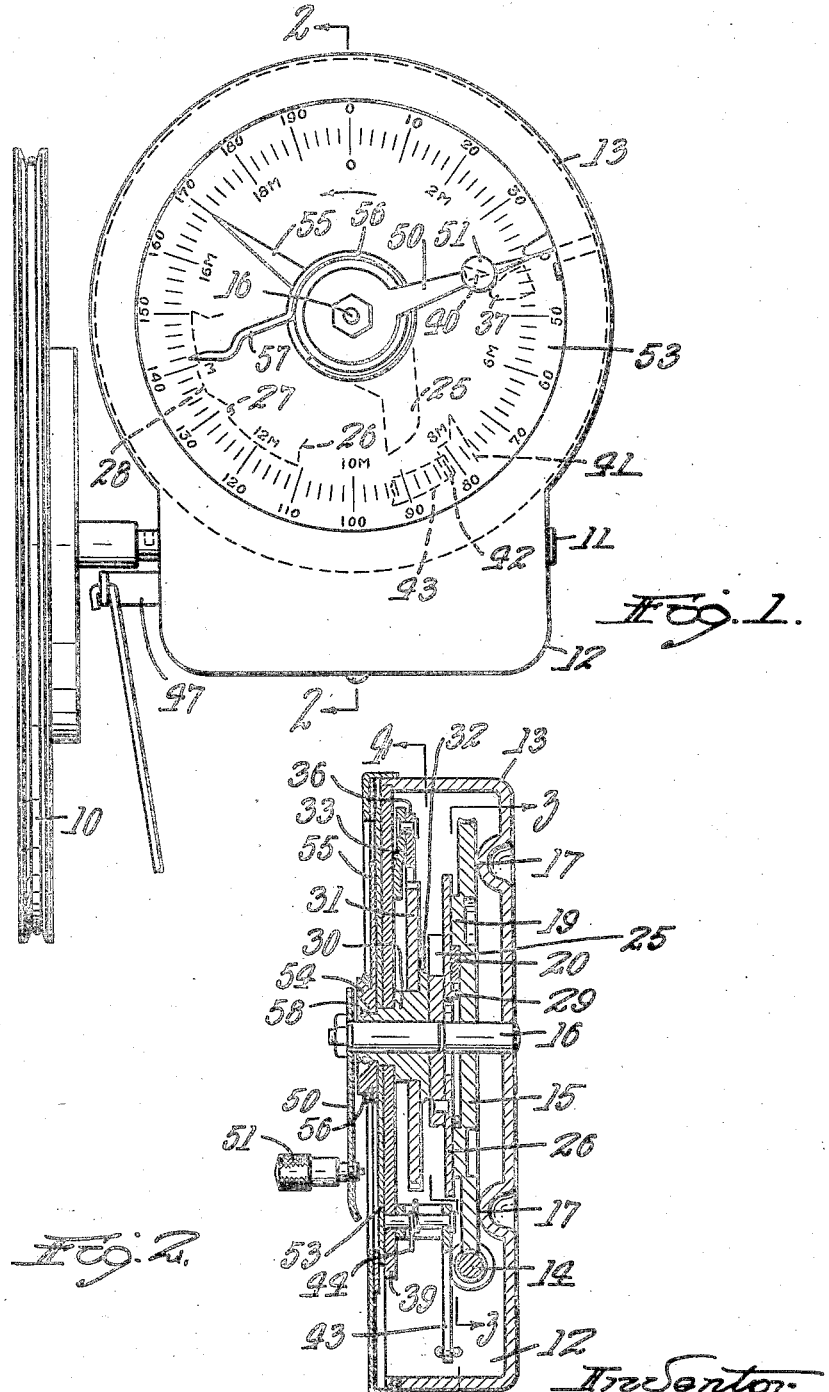

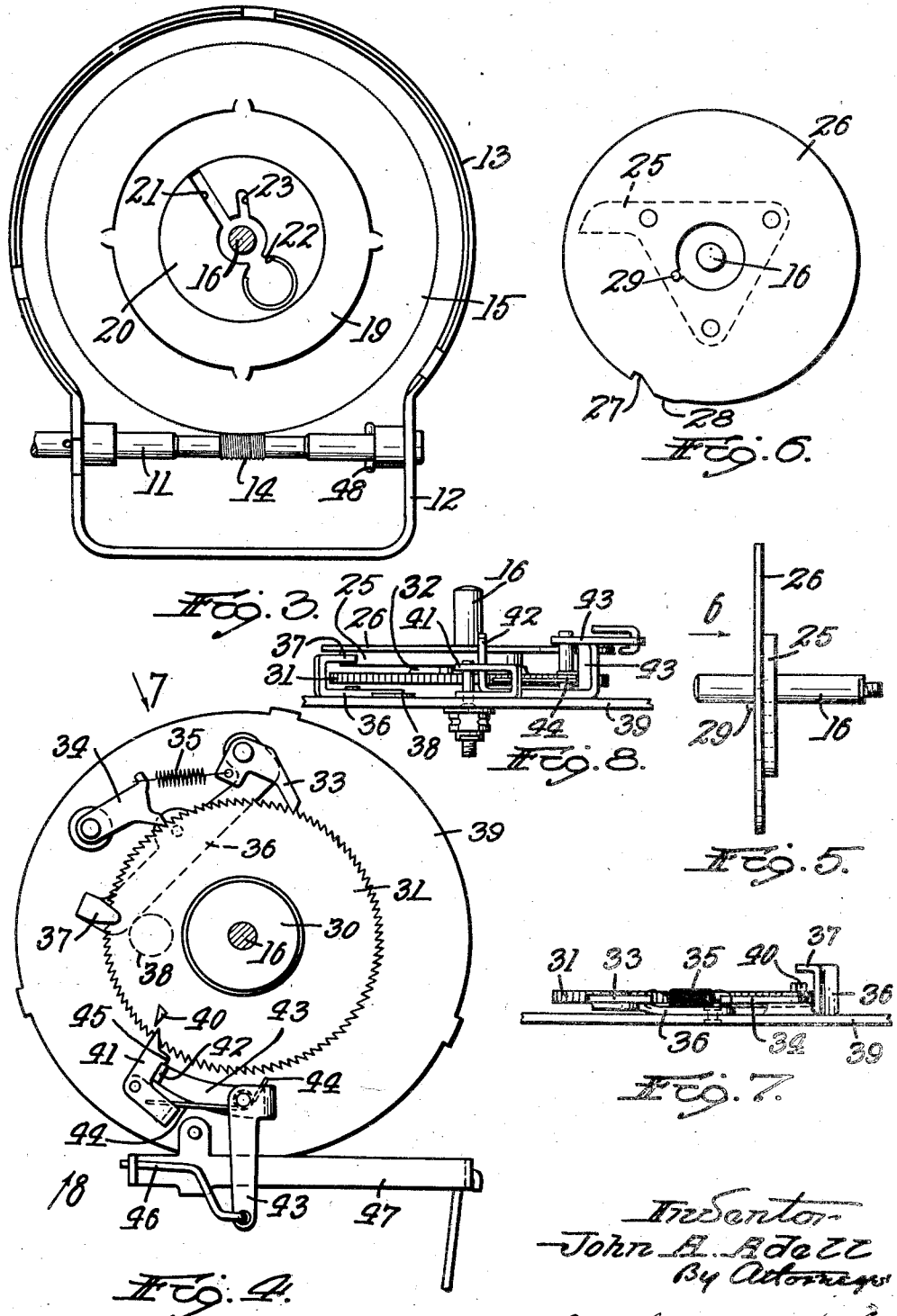

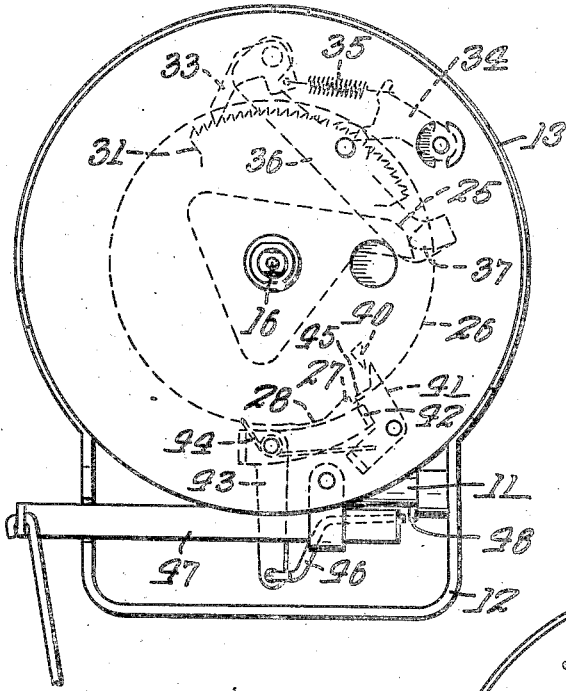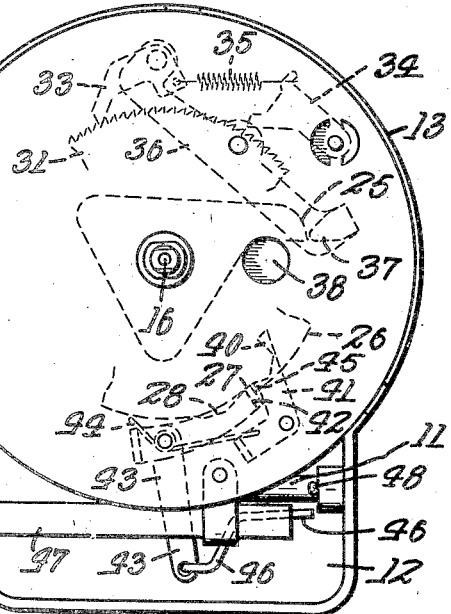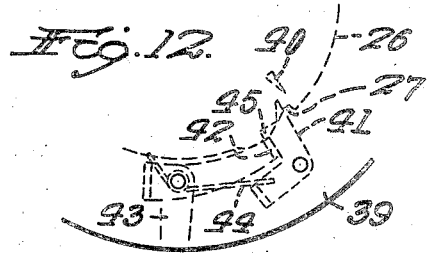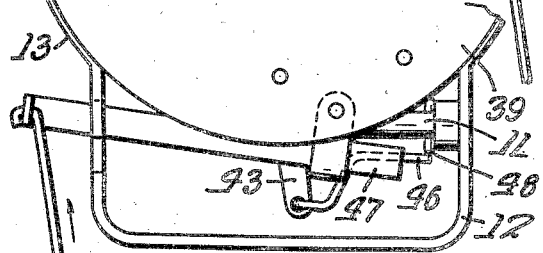

2,043,569

UNITED STATES PATENT OFFICE 2,043,569

YARN MEASURING DEVICE

John A. Adell, Orange, Mass.

Application April 6, 1934, Serial No. 719,345

10 Claims. (Cl. 33—132)

This invention relates to a measuring device for yarn or textiles in which, after the desired yardage has been passed through the machine, the machine is stopped automatically as in my Patent No. 1,938,445, issued December 5, 1933.

The principal objects of this invention are to simplify this type of machine by reducing the number and complication of the parts and to render it free acting by eliminating or reducing the friction.

Other objects and advantages of the invention are to eliminate complications of what amounts to a counting device for allowing a machine to measure off a predetermined yardage before it stops, without dispensing with this function; to provide an improved machine stopping, lever-controlling device, of such a nature that no part of it will bear on the cam disc or other rotating part; to improve the pawl arrangement which moves and holds the toothed cam disc so that no friction will be applied to the cam disc, except what is necessarily present and acting through the pawls.

Other objects and advantages of the invention will appear hereinafter.

Reference is to be had to the accompanying drawings, in which

Fig. 1 is a front elevation of a preferred embodiment of this invention, showing the outside of the casing after the pointers are set to measure the desired yardage;

Fig. 2 is a vertical diametrical sectional view on the line 2—2 of Fig. 1;

Fig. 3 is an elevation of the worm wheel and associated parts, with parts in section on the line 3—3 of Fig. 2;

Fig. 4 is an elevation of the ratchet wheel and pawls with parts in section on the line 4—4 of Fig. 2 with the parts at the zero position;

Fig. 5 is an edge view of the cam wheel;

Fig. 6 is a face view of the same, as indicated by the arrow 6 in Fig. 5;

Fig. 7 is an edge view of the operating pawls for the ratchet wheel, taken in the direction of the arrow 7 in Fig. 4;

Fig. 8 is a similar view of the machine stopping mechanism, taken in the direction of the arrow 8 in Fig. 4;

Fig. 9 is a rear view of the casing showing the parts illustrated in Fig. 4 in dotted lines and in normal operating position just before the machine is to be stopped;

Fig. 10 is a similar view showing the parts in the stopping position;

Fig. 11 is a view similar to the bottom of Fig. 10, showing the actuation of the machine stopping device, and Fig. 12 is a view similar to Fig. 10 showing the parts of the mechanism in the position assumed when the machine has stopped and is ready to start again, the same position as in Fig. 4.

As stated, this machine is for the purpose of measuring yarn, thread or fabric and is of the type in which the said yarn, thread or fabric is passed, one or more times, around a grooved wheel 10 and taken around with the wheel in continuous length to a winding machine or the like. This, of course, rotates the wheel in accordance with the speed of the yarn. The wheel generally is made of such a diameter as to have a circumference of one half yard. Thus one rotation of the wheel represents the feeding of one half yard of material.

The wheel is fixed on a shaft 11 which is mounted in bearings on an extension 12 of a circular casing 13. On the shaft is a worm 14 which drives a worm wheel 15, as usual. The number of teeth on the wheel 15 controls, of course, the number of its rotations relative to those of the shaft 11. The worm wheel 15 is supported by, but not fixed to, a shaft 16, but is loose upon it. In order to reduce the friction of the wheel 15 against the casing or against a washer or the like, the casing is provided with a circular convex projection 17 against which the wheel 15 bears so that there is only a small bearing surface and yet the wheel is held against motion backwardly beyond the desired point.

On the other side of the wheel 15 is an annular projection 19. Within this projection is a circular clutch disc 20. This clutch disc is perforated at the center so that it will have no bearing on the shaft 16. It is provided with a radial slit 21 extending from this perforation to its circumference so that it can be expanded or contracted. Diametrically opposite this slit is a slot 22 shown of circular form so that only a thin piece of metal is left to connect the two halves of the disc beyond this slot and render the disc flexible to that extent. The disc is also provided with another radial slot 23 by which the disc can be turned. Obviously, if some instrument is inserted in the slot 23 and pushed in one direction, that is, the direction away from the nearest wall of the slit 21, it will expand the clutch disc and prevent its turning in the circular space by increasing the friction of the circular periphery of the disc against the space in which it is located. If it is pushed in the other direction, it will contract the disc, relieve the friction and the disc can be turned in that direction only. In order for the disc 20 to engage the inner wall of the annular projecting flange 19, for driving, the disc 20 has to be initially expanded.

Fixed on the shaft 16 is a cam 25 to which is fixed a cam disc 26 having a notch 27 in its edge with a slight projection 28 at the end of the slanting side of the notch. This disc 26 is provided with a pin 29 which engages in the slot 23. It will be seen that the disc 20 and the disc 26 are free from each other, one being fixed on the shaft 16 and the other being mounted on the wheel 15. Rotatably mounted on the shaft 16 is a hub 30 having fixed thereon a ratchet wheel 31. The hub is provided with an extension 32 to fill the space between the ratchet wheel and the cam 25.

A plate 39 fixed to the casing serves as a support for a lever 36 and a holding pawl 34 which are pivoted to this plate. A spring 35 connects the pawl 34 with an advancing pawl 33, pivoted on the lever 36, and constitutes a single means for operating both of them. The lever 36 is provided with an arm 37 passing over the edge of the ratchet wheel in the path of the cam 25 to be operated thereby at each rotation. On the plate 39 is a fixed stop 38 for this lever 36. As will appear, these pawls and lever with a single spring cooperate to advance the ratchet wheel one step for each rotation of the cam 25 and for holding the ratchet wheel so that it will not over-rotate.

On the ratchet wheel 31 is a cam 40 which, as shown in Figs. 4, 9, 10, and 12, operates a lever 41 pivoted on the plate 39. This lever is moved out by this cam 40 about its pivot so as to release a tail 42 on a lever 43 also pivoted on this plate (see Fig. 10). A spring 44 wound around the pivot of the lever 43 also engages a U-shaped wall on the lever 41 and acts to control and operate both levers. There is a tooth 45 on the lever 41 which normally holds the tail 42 in the position shown in Fig. 4 but, when released by the cam 40, the lever 43 will be freed and its spring will swing it around, as shown in Figs. 10 and 12. To the end of this lever 43 is pivoted a rod 46 which passes through an opening in the end of the stop lever 47. Therefore, when the lever 43 is released this operating lever 47 will move from the position shown in Fig. 9, which is the normal operating position, to the stopping position shown in Fig. 11. The rod 46 is engaged by a pin 48 rotating with the shaft 11 and swings the lever 47.

When the tail 42 moves inwardly, as shown in Fig. 10, it is received in the notch 27, which at that time registers with it. Upon further rotation the slanting side of this notch swings the tail 42 outwardly and the high surface 28 forces it far enough out to enable it to lock back of the tooth 45.

Fixed to the shaft 16 is a pointer 50 having a spring-pressed rod 51 of the usual type with a plunger thereon. A front plate 53 is mounted in the casing in stationary position and exposed in the front and provided with the double scale of the instrument. Outside this is a hub 54 fixed with respect to the ratchet wheel and having a pointer 55 and provided with an external circumferential groove just outside the plane of the pointer. In the groove is located a spring 56 having a grip on the groove and adapted to be turned thereon by friction and having an end 57 which serves as a handle for operating it. A wire spring 58 is located in the groove in the hub 30 to hold the plate carrying the pointer 55 in its proper position axially.

The method of operation is the same broadly speaking as that set forth in the patent to Brink No. 1,286,927, patented December 10, 1918. Also the method of setting and the method of using the two scales is the same as that set forth in my own prior patent, No. 1,938,445, patented December 5, 1933.

The difference between this case and the patent to Brink is in the simplification, reduction of parts and elimination of friction.

Having thus described my invention and the advantages thereof, I do not wish to be limited to the details herein disclosed, otherwise than as set forth in the claims, but what I claim is:—

1. In a measuring machine, the combination with a shaft, a cam on said shaft, a front plate, a double scale thereon, a fixed plate behind the front plate, a holding pawl pivoted on said fixed plate, a lever pivoted on the fixed plate, an advancing pawl pivoted on the lever, a ratchet wheel in position to be engaged by said pawls, a single spring connecting said pawls for holding the holding pawl yieldingly against the teeth of the ratchet wheel and for operating the advancing pawl, said cam being adapted to engage the lever once during each rotation of the cam for shifting the lever and the advancing pawl to advance the ratchet wheel one tooth at each operation, pointers operated by the shaft and cam respectively for indicating the yardage on said double scale, and means operated by the ratchet wheel for stopping the machine.

2. In a measuring machine, the combination with a measuring wheel adapted to be operated by the passage of a continuous length of material around it, a ratchet wheel, a lever pivoted on a stationary axis, having connections for operating the ratchet wheel intermittently, a cam, adapted to be connected with the measuring wheel and rotated thereby, and arranged in position to operate said lever once during each rotation of the cam, a second cam on the ratchet wheel, a device for stopping the machine, comprising a lever pivoted on a stationary axis and having an arm in the path of the second cam, a second lever having means for actuating the machine stopping device and pivoted on a stationary axis, the second lever having means for holding the first lever in position ready to be operated, and a single spring engaging the last two levers and holding them in their normal inoperative position.

3. In a measuring device, the combination with a measuring wheel and a second wheel connected with the measuring wheel to be rotated solely by the operation of the measuring wheel, a front plate, a shaft, a cam fixed to the shaft, means for transmitting the motion of the wheel to the cam to rotate the cam with the second wheel, pawls carried by the front plate, means connected with said pawls and operated by the cam for shifting the pawls, a ratchet wheel adapted to be advanced one step by the pawls for each rotation of the cam, and pointers connected with the cam and the ratchet wheel for indicating the rotation of the measuring wheel.

4. In a measuring device, the combination with a measuring wheel adapted to be operated by the material to be measured, a worm wheel connected to be rotated slowly and positively by the measuring wheel, a clutch, a disc, means for causing the disc to rotate in one direction, a ratchet wheel, means rotatable with the disc for actuating the ratchet wheel to advance it a step for each complete revolution of said disc, a cam on the ratchet wheel, a lever pivoted on a stationary axis and having an arm adapted to be engaged by said cam, a second lever pivoted on a stationary axis and having means for holding the first lever in normal position, a single spring for holding both levers yieldingly in position, said cam being adapted to move the first lever to release the second lever when the ratchet wheel moves to a certain point, said second disc having a notch in the circumference for engaging the second lever after it has so moved and moving it back to normal position where it will hold the first lever, and means operated by the second lever for stopping the machine.

5. In a measuring device, the combination of a disc rotatable in one direction, a ratchet wheel, means rotatable with the disc for actuating the ratchet wheel to advance it a step for each complete revolution of said disc, a cam on the ratchet wheel, a lever pivoted on a stationary axis and having an arm adapted to be engaged by said cam, a second lever pivoted on a stationary axis and having means for holding the first lever in normal position, a single spring for holding both levers yieldingly in position, said cam being adapted to move the first lever to release the second lever when the ratchet wheel moves to a certain point, said disc having a notch in the circumference for engaging the second lever after it has so moved and moving it back to normal position where it will hold the first lever, and means operated by the second lever for stopping the machine.

6. In a measuring device, the combination of a disc rotatable in one direction, a ratchet wheel, a cam on the ratchet wheel, a lever pivoted on a stationary axis and having an arm adapted to be engaged by said cam, a second lever pivoted on a stationary axis and having means for holding the first lever in normal position, a single spring for holding both levers yieldingly in position, said disc having a notch in the circumference for engaging the second lever after it has so moved and moving it back to normal position where it will hold the first lever, and means operated by the second lever for stopping the machine.

7. In a measuring machine of the character described, the combination of a ratchet wheel, a rotary cam on one side of the wheel, a lever pivoted on a stationary axis on the other side of the wheel and having a projection extending over the wheel into the path of the cam to be operated thereby, and an advancing pawl pivoted on the lever and engaging the teeth of the ratchet wheel to operate it.

8. In a measuring machine of the character described, the combination of a ratchet wheel, a rotary cam, a lever pivoted on a stationary axis and having a projection extending over the wheel into the path of the cam to be operated thereby, an advancing pawl pivoted on the lever and engaging the teeth of the ratchet wheel to operate it, a holding pawl pivoted on a stationary axis, and a single spring connecting the two pawls to yieldingly force them into operative position.

9. In a stopping device for a measuring machine of the character described, the combination of a lever, means for operating the lever when the required length of material has been fed through the machine, a rod pivotally connected with the lever, a stopping lever having a guide for said rod, a shaft rotatable constantly when the material is being fed, and a projection on the shaft in position to engage and operate the rod when it is pushed forward by the motion of the first named lever, said guide being so located on the operating lever as to cause the rod to swing that lever to a position to stop the machine.

10. In a stopping device for a measuring machine of the character described, the combination of a lever, means for operating the lever when the required length of material has been fed through the machine, a rod pivotally connected with the lever, a stopping lever having a guide for said rod, means for operating the rod when it is pushed forward by the motion of the first named lever, said guide being so located on the operating lever as to cause the rod to swing that lever to a position to stop the machine when the rod is operated.

JOHN A. ADELL.